United States Patent
Gokhan et al.

(10) Patent No.: US 11,294,971 B1
(45) Date of Patent: Apr. 5, 2022

(54) SYSTEMS AND METHODS FOR MODELING ITEM SIMILARITY USING CONVERTED IMAGE INFORMATION

(71) Applicant: Coupang Corp., Seoul (KR)

(72) Inventors: Nuri Mehmet Gokhan, San Mateo, CA (US); Varun A Samtani, Seattle, WA (US)

(73) Assignee: Coupang Corp., Seoul (KR)

( * ) Notice: Subject to any disclaimer, the term of this patent is extended or adjusted under 35 U.S.C. 154(b) by 0 days.

(21) Appl. No.: 17/157,284

(22) Filed: Jan. 25, 2021

(51) Int. Cl.
  *G06K 9/62* (2006.01)
  *G06Q 30/02* (2012.01)
  (Continued)

(52) U.S. Cl.
  CPC ......... *G06F 16/951* (2019.01); *G06K 9/6215* (2013.01); *G06K 9/6218* (2013.01);
  (Continued)

(58) Field of Classification Search
  CPC .......... G06N 3/08; G06N 20/00; G06N 5/003; G06F 16/9535; G06F 16/583;
  (Continued)

(56) References Cited

U.S. PATENT DOCUMENTS 9,218,366 B1 * 12/2015 Li .................. G06F 16/583
10,650,824 B1   5/2020 Kesharaju et al.
(Continued)

FOREIGN PATENT DOCUMENTS

CN   107330750 B   3/2019

OTHER PUBLICATIONS

Liu et al., Automatic Document Metadata Extraction Based on Deep Networks, Jan. 5, 2018 [retrieved Mar. 22, 2021], 2017 National CCF Conference on Natural Language Processing and Chinese Computing, pp. 305-317. Retrieved: https://link.springer.com/chapter/10.1007/978-3-319-73618-1_26 (Year: 2018).*

(Continued)

*Primary Examiner* — Matthew C Bella
*Assistant Examiner* — Dennis Rosario
(74) *Attorney, Agent, or Firm* — Finnegan, Henderson, Farabow, Garrett & Dunner, LLP

(57) ABSTRACT

Systems and methods for correlating item data are disclosed. A system for correlating item data may include a memory storing instructions and at least one processor configured to execute instructions to perform operations including: receiving text and image data associated with a reference item from a remote device; converting, using a computer-modeled embedding layer, at least one image to an image embedding; comparing the image embedding to reference embeddings stored in a database; selecting a subset of the candidate item text as candidate text data based on the comparison; selecting a subset of the candidate item images as candidate image data based on the comparison; selecting a text correlation model; determining a first similarity score; selecting an image correlation model; determining a second similarity score; calculating a confidence score based on the first and second similarity scores; and performing a responsive action based on the calculated confidence score.

20 Claims, 4 Drawing Sheets

(51) Int. Cl.
*G06F 16/951* (2019.01)
*G06T 7/194* (2017.01)
*G06T 11/60* (2006.01)
*G06N 5/00* (2006.01)

(52) U.S. Cl.
CPC ........... *G06K 9/6276* (2013.01); *G06N 5/003* (2013.01); *G06Q 30/02* (2013.01); *G06Q 30/0201* (2013.01); *G06T 7/194* (2017.01); *G06T 11/60* (2013.01)

(58) Field of Classification Search
CPC .. G06F 16/35; G06F 16/5838; G06F 16/5866; G06F 16/5854; G06F 16/532; G06F 16/58; G06F 16/287; G06F 16/33; G06F 16/50; G06F 16/51; G06F 16/535; G06F 16/538; G06F 40/20; G06F 16/22; G06F 16/285; G06F 16/43; G06F 16/53; G06F 16/55; G06F 16/78; G06F 16/904; G06F 16/953; G06K 9/6267; G06K 9/6215; G06K 9/6218; G06K 9/6272; G06K 9/6268; G06K 9/6271; G06T 2207/20081; G06T 2207/20084; G06Q 30/0202; G06Q 30/02; G06Q 30/0255; G06Q 10/1053; G06Q 30/0601; G06Q 30/0603; G06Q 30/0631; G06Q 30/0201; G06Q 30/0243; G06Q 30/0251
See application file for complete search history.

(56) References Cited

U.S. PATENT DOCUMENTS

| | | | |
|---|---|---|---|
| 2008/0212899 A1* | 9/2008 | Gokturk | G06Q 30/0603 382/305 |
| 2015/0178786 A1* | 6/2015 | Claessens | G06Q 30/0269 705/14.66 |
| 2016/0124933 A1* | 5/2016 | Takeuchi | G06F 40/186 706/12 |
| 2017/0255648 A1* | 9/2017 | Dube | G06K 9/6201 |
| 2018/0075018 A1* | 3/2018 | Avkd | G06F 40/20 |
| 2018/0329990 A1* | 11/2018 | Severn | G06K 9/6274 |
| 2020/0142978 A1 | 5/2020 | Salokhe et al. | |
| 2020/0273570 A1 | 8/2020 | Subramanian et al. | |
| 2020/0380054 A1* | 12/2020 | Baudais | G06F 16/9532 |
| 2020/0380403 A1* | 12/2020 | Aggarwal | G06K 9/6257 |

OTHER PUBLICATIONS

Search Report and Written Opinion in counterpart PCT Application No. PCT/IB2021/051657 dated Oct. 14, 2021 (9 pages).

* cited by examiner

SYSTEMS AND METHODS FOR MODELING ITEM SIMILARITY USING CONVERTED IMAGE INFORMATION

TECHNICAL FIELD

Exemplary embodiments generally relate to systems and methods for correlating item data. For example, disclosed techniques may include converting images to image embeddings for comparisons. Some techniques may include calculating confidence scores and using similarity and confidence scores to perform a responsive action for maintaining item correlations.

BACKGROUND

In some situations, such as developing competitive analysis, online merchants and marketplace managers attempt to track competitor product information and compare this information to their own products. For example, such competitive analysis may include developing associations between products being provided by a merchant and the same or similar products being provided by a competitor. However, conventional techniques often involve manual user searches, comparisons, and conclusions, which can be slow and error-prone. Given the large amounts of user input and thousands or even millions of item comparisons involved, any similarities or associations between items produced by current systems are often obsolete by the time they are produced, making them unusable. Such large amounts of product and image information can also make it difficult to identify images that are relevant to each other. Moreover, in some cases, users may be unable to differentiate between certain items, which may establish a misleading association between two items, which in turn may unnecessarily use system resources to generate irrelevant information and misinform decisionmakers. Moreover, such misinformation can inhibit effective analysis and require further user intervention and remediation, requiring additional use of system resources. Conversely, users may incorrectly differentiate between two items that should be associated, leading to a deficiency of item association data, reducing the effectiveness of item analysis and/or competitive analysis.

In view of these deficiencies of item correlation analysis, there is a need for improved systems and methods for correlating item data, including item image data. The disclosed system and methods address one or more of the problems set forth above and/or other problems in the prior art.

SUMMARY

Consistent with the present embodiments, one aspect of the present disclosure is directed to a system for correlating item data. The system may comprise a non-transitory computer-readable medium containing a set of storing instructions and at least one processor configured to execute instructions to perform steps. These steps may comprise receiving text data associated with a reference item from a remote device; receiving image data comprising at least one image associated with the reference item from the remote device; converting, using a computer-modeled embedding layer, the at least one image to an image embedding; comparing the image embedding to reference embeddings stored in a database, the reference embeddings being associated with pairs of candidate item images and candidate item text; selecting a subset of the candidate item text as candidate text data based on the comparison; selecting a subset of the candidate item images as candidate image data based on the comparison; selecting a text correlation model; determining a first similarity score by applying the text correlation model to the received text data and the candidate text data; selecting an image correlation model; determining a second similarity score by applying the image correlation model to the received image data and the candidate image data; calculating a confidence score based on the first and second similarity scores; and performing a responsive action based on the calculated confidence score, and the responsive action may comprise at least one of creating an association, changing the text correlation model, or changing the image correlation model.

In another embodiment, converting the at least one image to the image embedding comprises removing background pixels from the at least one image.

In another embodiment, converting the at least one image to the image embedding comprises performing at least one of a cropping operation, a re-sizing operation, a brightness alteration operation, a contrast alteration operation, or an interpolation operation on the at least one image.

In another embodiment, the image embedding is a vector containing floating-point values associated with pixel information of the at least one image.

In another embodiment, the image embedding further contains values associated with metadata of the at least one image.

In another embodiment, comparing the image embedding to reference embeddings comprises performing a Euclidean-space nearest-neighbor search.

In another embodiment, the steps further comprise determining that the reference embeddings are associated with an item category of the reference item.

In another embodiment, the compared reference embeddings are part of a Euclidean-space embedding cluster among a plurality of Euclidean-space reference embedding clusters.

In another embodiment, the responsive action further comprises updating at least one of the plurality of Euclidean-space reference embedding clusters.

In another embodiment, the candidate text data includes a set of canonical attributes of a candidate item; and determining the first similarity score comprises: determining a set of reference attributes of the reference item corresponding in part to the set of canonical attributes; and comparing the reference set of attributes to the set of canonical attributes.

In another embodiment, at least one of the canonical and reference attributes corresponds to: a color, a dimension, a model number, a weight, a shape, a scent, a material, a time of production, a multi-part item, or an item feature.

In another embodiment, the steps further comprise: determining whether the confidence score falls below a threshold; and when the confidence score falls below the threshold, determining a differentiation factor indicating a difference between the reference item and the at least one candidate item The responsive action may also comprise adjusting a parameter of the text model or the image model using the differentiation factor or adding a new parameter to the text model or image model based on the differentiation factor.

In another embodiment, the steps may further comprise: determining whether the confidence score is equal to or greater than a threshold; and when the confidence score is equal to or greater than the threshold: creating an association between the reference item and the candidate item; monitoring a webpage associated with the reference item to detect a change at the webpage; and transmitting a notification to a user device upon detecting a change to information associated with the reference item at the webpage.

In another embodiment, the detected change is associated with a price of the reference item at the monitored webpage.

In another embodiment, the image correlation model is a random forest model.

In another embodiment, the text correlation model contains a text frequency parameter having a weight that is inversely related to a frequency of a character combination in a reference dataset.

In another embodiment, the text correlation model is trained to ignore a property of the received text data when determining the first similarity score or the reference text data or the image correlation model is trained to ignore a property of the received image data or the reference image data when determining the second similarity score.

In another embodiment, the ignored property is based on a user input.

Yet another aspect of the present disclosure is directed to a computer-implemented method for correlating item data. The method may comprise receiving text data associated with a reference item from a remote device; receiving image data comprising at least one image associated with the reference item from the remote device; converting, using a computer-modeled embedding layer, the at least one image to an image embedding; comparing the image embedding to reference embeddings stored in a database, the reference embeddings being associated with pairs of candidate item images and candidate item text; selecting a subset of the candidate item text as candidate text data based on the comparison; selecting a subset of the candidate item images as candidate image data based on the comparison; selecting a text correlation model; determining a first similarity score by applying the text correlation model to the received text data and the candidate text data; selecting an image correlation model; determining a second similarity score by applying the image correlation model to the received image data and the candidate image data; calculating a confidence score based on the first and second similarity scores; performing a responsive action based on the calculated confidence score, wherein the responsive action comprises at least one of creating an association, changing the text correlation model, or changing the image correlation model.

Yet another aspect of the present disclosure is directed to a system for correlating item data. The system may comprise a database storing associations between item data and a computing device. The computing device may comprise at least one processor and a non-transitory computer-readable medium containing a set of instructions that, when executed by the at least one processor, cause the at least one processor to perform steps. The steps may comprise: receiving text data associated with a reference item from a remote device; receiving image data comprising at least one image associated with the reference item from the remote device; analyze the at least one image to determine a distinct portion of the at least one image; converting, using a computer-modeled embedding layer, the distinct portion to an image embedding; comparing the image embedding to reference embeddings stored in the database, the reference embeddings being associated with pairs of candidate item images and candidate item text; selecting a subset of the candidate item text as candidate text data based on the comparison; selecting a subset of the candidate item images as candidate image data based on the comparison; selecting a text correlation model; determining a first similarity score by applying the text correlation model to the received text data and the candidate text data; selecting an image correlation model; determining a second similarity score by applying the image correlation model to the received image data and the candidate image data; calculating a confidence score based on the first and second similarity scores; performing a responsive action based on the calculated confidence score, wherein the responsive action comprises at least one of creating an association between the reference item and the candidate item, changing the text correlation model, or changing the image correlation model.

Consistent with other disclosed embodiments, exemplary embodiments of non-transitory computer readable storage media may store program instructions, which may be executed by at least one processor device and perform any of the methods described herein.

The foregoing general description and the following detailed description provide exemplary embodiments and are not restrictive of the claims.

BRIEF DESCRIPTION OF THE DRAWINGS

The accompanying drawings, which are incorporated in and constitute a part of this specification, illustrate several embodiments and, together with the description, serve to explain the disclosed principles. In the drawings.

DETAILED DESCRIPTION

The disclosure is generally directed to automated systems and processes for coordinating the analysis, transmission, and management of item data.

Reference will now be made in detail to exemplary embodiments, examples of which are illustrated in the accompanying drawings and disclosed herein. The disclosed embodiments are described in sufficient detail to enable those skilled in the art to practice the disclosed embodiments. It is to be understood that other embodiments may be utilized and that changes may be made without departing from the scope of the disclosed embodiments. Thus, the materials, methods, and examples are illustrative only and are not intended to be necessarily limiting.

Figure 1:
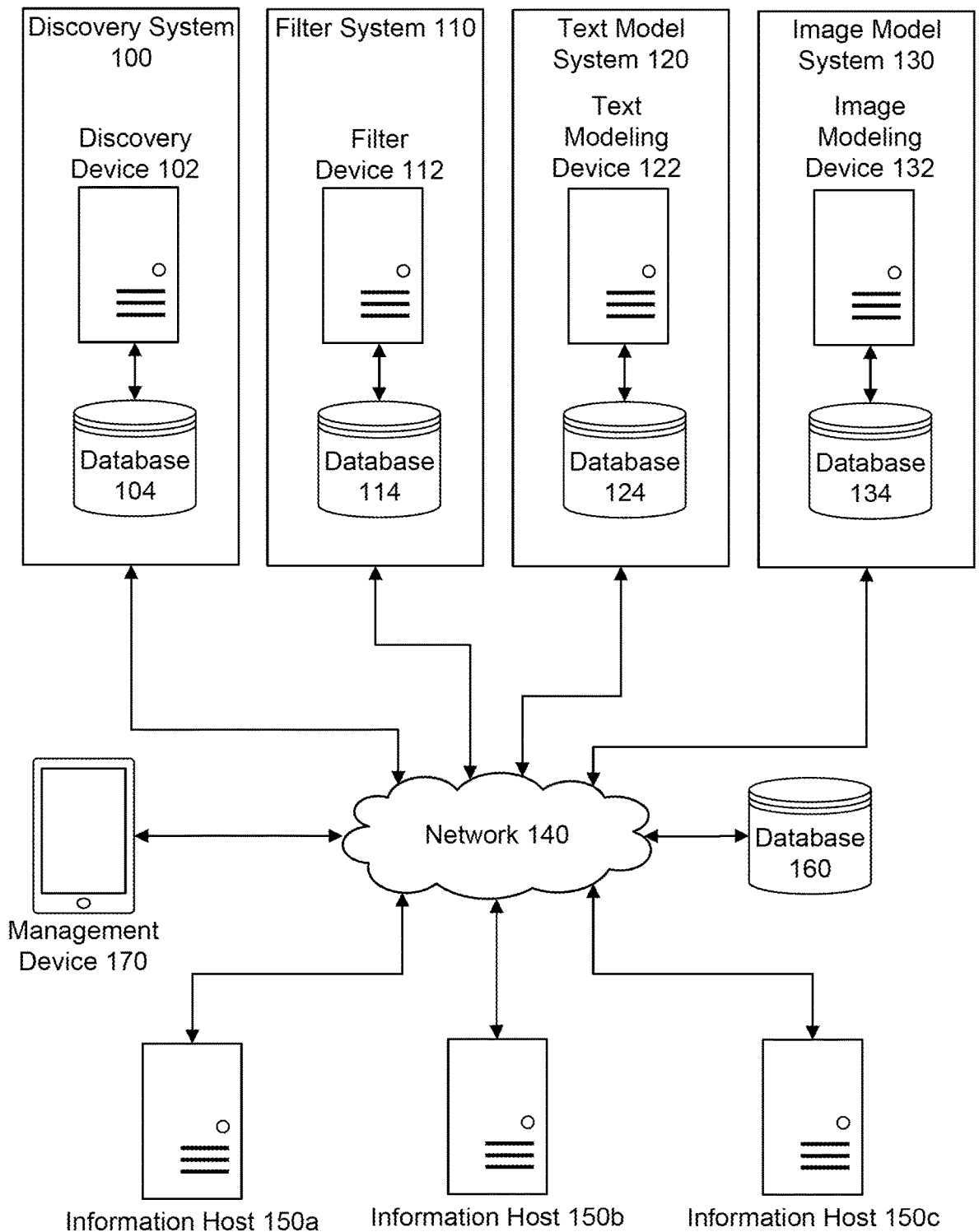
FIG. 1 illustrates an exemplary pictographic representation of a network architecture for correlating item data, consistent with disclosed embodiments.

FIG. 1 illustrates an exemplary pictographic representation of network architecture 10, which may include at least one computing device (e.g., discovery device 102) configured to carry out processes discussed herein. In some embodiments, a computing device may be associated with a software developer, company, online merchant, and/or other entity involved with analyzing item data. In some embodiments, network architecture 10 may include discovery system 100, which may be associated with discovering data related to an item, such as by crawling information from a webpage (e.g., crawling hypertext markup language (HTML) data from a seller website). Discovery system 100 may include a discovery device 102, which may be a physical server, virtual server, or other computing device associated with discovering data related to an item. In some embodiments, discovery device 102 may implement a webpage crawling application or service, which may crawl a webpage (including a plurality of webpages, which may be selected by a user and/or a computerized model). For example, discovery device 102 may (e.g., periodically) parse text, HTML data, metadata, or other information from a webpage, and may extract a portion (including all or none) of the parsed information from the webpage (e.g., according to user-defined and/or machine-defined crawling and/or extraction rules). Discovery system 100 may also include a database 104, which may include HTML data (e.g., copied from a webpage), item data, structured data, unstructured data, item information history, and/or any information related to information of a webpage associated with an item.

In some embodiments, network architecture 10 may include filter system 110, which may be associated with filtering data related to an item, such as by performing a search (e.g., a search across item data associated with multiple items, which may be performed using an Elasticsearch engine). Filter system 110 may include a filter device 112, which may be a physical server, virtual server, or other computing device associated with filtering data related to an item. Filter system 110 may also include a database 114, which may include HTML data, item data, structured data, unstructured data, item information history, search history, current search results, previous search results, and/or any information related to filtering item information.

In some embodiments, network architecture 10 may include text model system 120, which may be associated with performing text analysis operations associated with item data. Text model system 120 may include a text modeling device 122, which may be a physical server, virtual server, or other computing device associated with analyzing item text data. For example, text modeling device 122 may be configured to implement a computerized model for determining matches between reference item text data and candidate item datasets (e.g., according to a combination of user-determined and/or machine-determined parameters), scoring text data, determining a confidence score, determining a threshold, etc. Text model system 120 may also include a database 124, which may include a model, a model identifier, text data, a term library, HTML data, item data, structured data, unstructured data, item information history, text matching history, and/or any information related to text data associated with an item.

In some embodiments, network architecture 10 may include image model system 130, which may be associated with performing image analysis operations associated with item data. Image model system 130 may include an image modeling device 132, which may be a physical server, virtual server, or other computing device associated with analyzing item image data. For example, image modeling device 132 may be configured to implement a computerized model for matching image data between item datasets (e.g., according to a combination of user-determined and/or machine-determined parameters), scoring image data, determining a confidence score, determining a threshold, etc. Image model system 130 may also include a database 134, which may include a model, a model identifier, image data, a term library, HTML data, item data, structured data, unstructured data, item information history, text matching history, and/or any information related to image data associated with an item.

In some embodiments, network architecture 10 may include a network 140, which may communicably couple any of the aforementioned and subsequently mentioned devices. Network 140 may be a public network or private network and may include, for example, a wired or wireless network, including, without limitation, a Local Area Network (LAN), a Wide Area Network (WAN), a Metropolitan Area Network, an IEEE 802.11 wireless network (e.g., "Wi-Fi"), a network of networks (e.g., the Internet), a land-line telephone network, or the like. Network 140 may be connected to other networks (not depicted in FIG. 1) to connect the various system components to each other and/or to external systems or devices. In some embodiments, network 140 may be a secure network and require a password to access the network, or a portion of the network. Although discovery system 100, filter system 110, text model system 120, and image model system 130 are illustrated as separate and discrete systems in FIG. 1, it is contemplated that in some embodiments, one or more of discovery system 100, filter system 110, text model system 120, and image model system 130 may include some or all of the four discretely illustrated systems.

In some embodiments, network architecture 10 may include a database 160, which may include any of the data mentioned above with respect to databases 104, 114, 124, and/or 134. In some embodiments, database 160 may be configured to store datasets and/or one or more dataset indexes, consistent with disclosed embodiments. Database 160 may include a cloud-based database (e.g., a database implementing a Relational Database Service (RDS)) or an on-premises database. Database 160 may also be a relational or non-relational database. Database 160 may include item data, image data, text data, configuration data, expression data, datasets, model data (e.g., model parameters, training criteria, performance metrics, etc.), and/or other data, consistent with disclosed embodiments. Database 160 may include data received from one or more components of network architecture 10 and/or computing components outside network architecture 10 (e.g., via network 140).

Network architecture 10 may also include management device 170, which may be associated with a user having configuration permissions for a device within network architecture 10. For example, management device 170 may be a computer, laptop, mobile device, server, or any device allowing a user to interact with another device in network architecture 10 (e.g., change a model parameter at text model system 120 or image model system 130). In some embodiments, management device 170 may grant access to another device (e.g., access to text model system 120 and/or image model system 130) after receiving valid login credentials based on user input.

In some embodiments, network architecture 10 may include at least one information host, such as information hosts 150*a*, 150*b*, and 150*c*. An information host may be a web server, content management server, mobile application host, non-web data host, database, cache, or any other device that may provide information (e.g., item information) to another device across a network (e.g., the Internet). For example, an information host may host one or more webpages, which may include text data, image data, and/or other information related to an item or a plurality of items (e.g., products). In some embodiments, an information host may be associated with an online seller (e.g., merchant, online marketplace host, manufacturer, etc.). In some embodiments, an information host may be an archive hosting current and/or previous webpage data from another information host.

Figure 2:
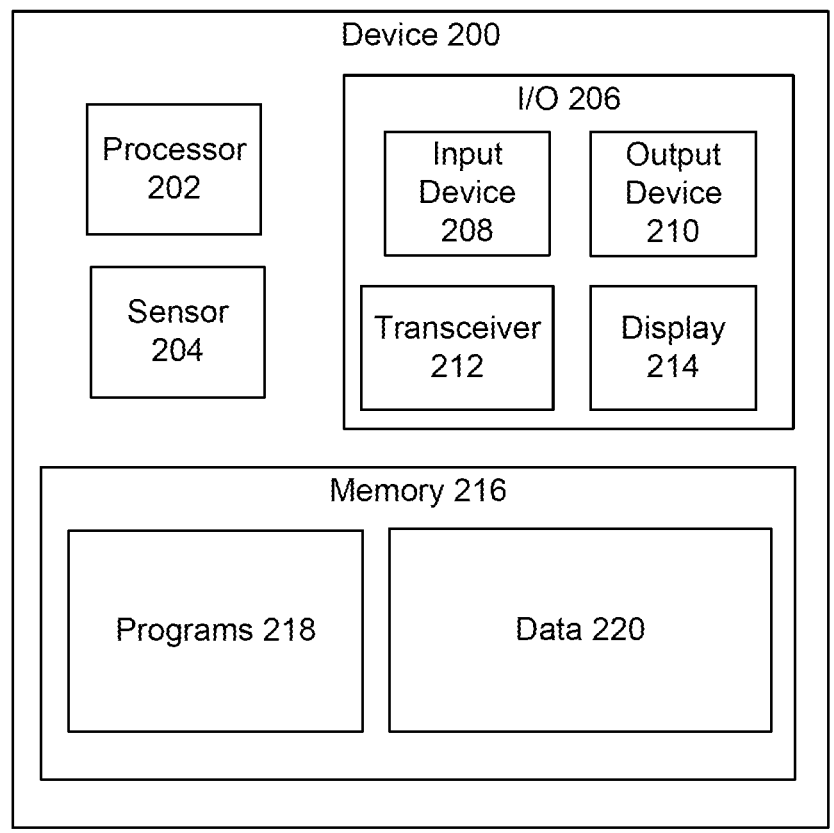
FIG. 2 illustrates an exemplary pictographic representation of a device for correlating item data, consistent with disclosed embodiments.

FIG. 2 illustrates an exemplary pictographic representation of device 200, which may carry out processes discussed herein. For example, device 200 may constitute one or more of discovery device 102, filter device 112, text modeling device 122, image modeling device 132, management device 170, databases 104, 114, 124, 134, and/or 160, and/or information hosts 150*a*, 150*b*, and/or 150*c*. Device 200 may include a processor 202, which may include one or more dedicated processing units, application-specific integrated circuits (ASICs), field-programmable gate arrays (FPGAs), graphical processing units, or various other types of processors or processing units coupled with memory 216. Processor 202 may constitute a single-core or multiple-core processor that executes parallel processes simultaneously. For example, processor 202 may be a single-core processor configured with virtual processing technologies. In some embodiments, processor 202 may use logical processors to simultaneously execute and control multiple processes. Processor 202 may implement virtual machine technologies, or other known technologies to provide the ability to execute, control, run, manipulate, store, etc., multiple software processes, applications, programs, etc. For example, a virtual computing instance (e.g., virtual machine, container, etc.) may be spun up or spun down (e.g., at a discovery device 102, filter device 112, text modeling device 122, image modeling device 132, etc.) in response to processing demands (e.g., additional resources needed for webpage crawling, image manipulation, etc.). In another embodiment, processor 202 may include a multiple-core processor arrangement (e.g., dual core, quad core, etc.) configured to provide parallel processing functionalities to allow execution of multiple processes simultaneously. One of ordinary skill in the art would understand that other types of processor arrangements could be implemented that provide for the capabilities disclosed herein. The disclosed embodiments are not limited to any type of processor. Processor 202 may execute various instructions stored in memory 216 to perform various functions of the disclosed embodiments described in greater detail below. Processor 202 may be configured to execute functions written in one or more known programming languages.

In some embodiments, device 200 may include a sensor 204, such as an accelerometer, a light sensor, an audio sensor, an infrared sensor, a motion sensor, a piezoelectric sensor, a laser sensor, a sonar sensor, a Global Positioning System (GPS) sensor, an electromagnetic sensor, and the like. Sensor 204 may detect and/or collect data, which device 200 may store (e.g., at memory 216) and/or transmit to another device.

Device 200 may also include input/output devices (I/O) 206, which may include an input device 208, which may include, for example, at least one of a router, a touchscreen, a keyboard, a microphone, a speaker, a haptic device, a camera, a button, a dial, a switch, a knob, a touch pad, a button, a microphone, a location sensor, an accelerometer, a camera, a fingerprint scanner, a retinal scanner, a biometric input device, an ultrasonic scanner, or the like. As will be appreciated by one of skill in the art, input device 208 may be any device capable of receiving inputs, including user inputs, to perform or assist in performing methods consistent with disclosed embodiments.

I/O 206 may also include an output device 210, which may include any device configured to provide user feedback, such as a visual display, a light-emitting diode (LED), a speaker, a haptic feedback device, or the like.

I/O 206 may include a transceiver 212, which may be configured to connect with at least one of any type of data network. For example, transceiver 212 may be at least one of a mobile network transceiver, Wi-Fi transceiver, a LiFi transceiver, Near Field Communication (NFC) transceiver, a radio transceiver, an ultra-high frequency (UHF) transceiver, a Bluetooth transceiver, an infrared transceiver, or other wireless transceiver.

I/O 206 may include a display 214, which may display data or other information associated with the processes described herein. For example, display 214 may include a liquid crystal display (LCD), in-plane switching liquid crystal display (IPS-LCD), an LED display, organic light-emitting diode (OLED) display, active-matrix organic light-emitting diode (AMOLED) display, cathode ray tube (CRT) display, plasma display panel (PDP), digital light processing (DLP) display, or any other display capable of connecting to a user device and depicting information to a user. Display 214 may display graphical interfaces, interactable graphical elements, animations, dynamic graphical elements, and any other visual element.

Device 200 may also include memory 216, which may be a single memory component, or multiple memory components. Such memory components may include an electronic storage device, a magnetic storage device, an optical storage device, an electromagnetic storage device, a semiconductor storage device, or any suitable combination of the foregoing. For example, memory 216 may include any number of hard disks, random access memories (RAMs), read-only memories (ROMs), erasable programmable read-only memories (EPROMs or Flash memories), and the like. Memory 216 may include one or more storage devices configured to store instructions usable by processor 202 to perform functions related to the disclosed embodiments. Memory 216 may also include any number of programs, applications, application program interfaces (APIs), or any other data, consistent with the disclosed embodiments.

In some embodiments, memory 216 may store programs 218, which may include one or more programs (e.g., APIs, processes, modules, code, scripts, or functions) used to perform methods consistent with disclosed embodiments. For example, memory 216 may include operation code (e.g., operating system code, application operation code, etc.) according to which an application may run on device 200. Programs 218 may be written in one or more programming or scripting languages. Memory 216 may also maintain data 220, which may include data associated with a user account, an application, a particular device, a model, a communication, or any other data related to analyzing item data. Data may be exchanged with a device 200 or between devices (e.g., text model modeling device 122 and image modeling device 132, management device 170 and filter system 110, text modeling device 122 and information host 150*b*, etc.) in accordance with any number of formats or protocols, including extensible markup language (XML), Representational State Transfer (REST), Simple Object Access Protocol (SOAP), JavaScript Object Notation (JSON), GraphQL, and the like.

Memory 216 may also include a model (not shown), which may be an artificial intelligence (AI) model for analyzing item data, consistent with disclosed embodiments. A model may be, without limitation, any one of a computer software module, an algorithm, a machine-learning model, a data model, a statistical model, a random forest model, a recurrent neural network (RNN) model, a long-short term memory (LSTM) model, a convolutional neural network model (e.g., a ResNet-50 model), or another neural network model, consistent with disclosed embodiments. In some embodiments, a model may be a model in a learning stage or may have been trained to a degree (e.g., by a developer, a machine, or a combination of both). In some embodiments, a developer may interact with a model to approve or disapprove of suggested changes to a model or parameters of a model (e.g., suggested by a machine). After such an interaction, the model may be updated to reflect the user interactions and/or machine inputs.

Figure 3:
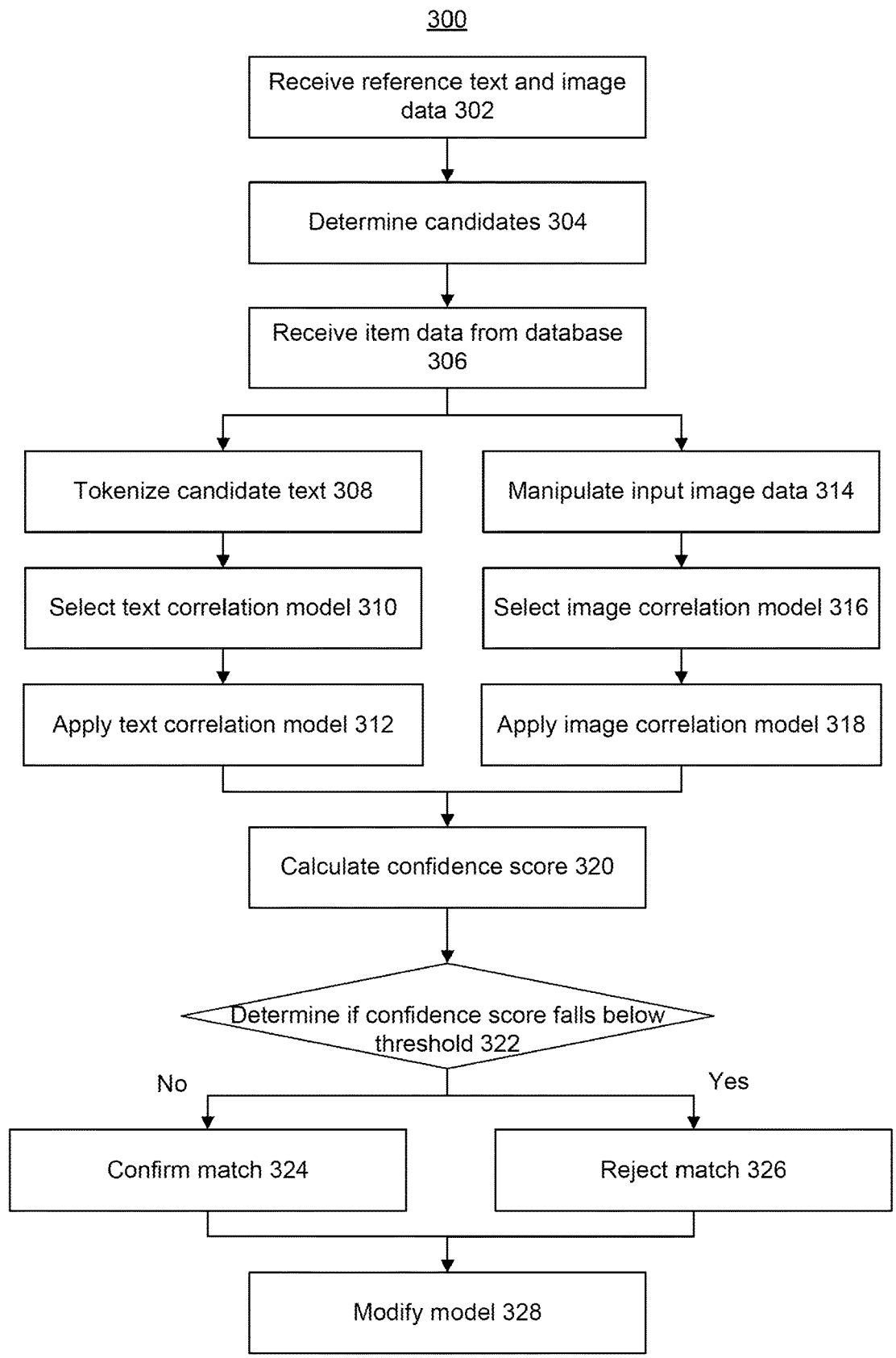
FIG. 3 depicts a flowchart of an exemplary process for correlating item data, consistent with disclosed embodiments.

FIG. 3 depicts a flowchart of an exemplary process 300 for correlating item data, which may be performed by a processor in accordance with disclosed embodiments. For example, process 300 may be performed entirely or in part by device 200 (e.g., using processor 202), such as a text modeling device 122 (or any other device within network architecture 10. Alternatively or additionally, some steps of process 300 may be performed by multiple devices 200, such as discovery device 102, filter device 112, text modeling device 122, and/or image modeling device 132. While process 300 is described with respect to device 200, one of skill will understand that the steps illustrated in FIG. 3 are exemplary and steps may be added, merged, divided, duplicated, repeated, modified, performed sequentially, performed in parallel, and/or deleted in some embodiments.

At step 302, device 200 may receive text data and/or image data, either or both of which may be associated with a reference item. For example, device 200 may receive text data associated with a reference item from a remote device (e.g., an information host). Device 200 may also receive image data associated with the reference item from another device, which may be the same remote device from which the text data is received, or a different remote device. In some embodiments, the image data may comprise at least one image associated with the reference item. In some embodiments, text and/or image data may have been crawled from an information host (e.g., information host 150c). For example, device 200, such as discovery device 102, may execute a web crawling application or service to gather data related to a reference item from an information host (discussed above). In some embodiments, such as where one information host does not host web data directly, device 200 may receive reference item information from another information host, such as by calling a public application program interface (API) to access reference item data. In some embodiments, device 200 may receive data from a remote device (e.g., an information host) through data crawling or another operation (e.g., transmitting a data request, receiving passively, etc.). Text data may include an item identifier (e.g., a product name, Universal Product Code (UPC), European Article Number (EAN)), manufacturer identifier (e.g., a manufacturer name), a seller identifier (e.g., a seller username), a model number, a serial number, a location of origin (e.g., a country of origin, a region of origin, etc.), a price value, a sale value, a discount value, an item specification, and/or other information related to an item described by an information host. An item specification may include any information related to a characteristic of an item (e.g., product) such as a color, a dimension, a size (e.g., size of a clothing article), a model number, a weight, a shape, a scent, a material, a time of production, a multi-part item, or an item feature (e.g., 4K display capability, 5G data transmission capability, electrically-powered, manually powered, light-emitting diode (LED) display, etc.). In some embodiments, device 200 may generate an amount of text data based on received text data (e.g., reference text data). For example, device 200 may determine a product serial number (e.g., generate a serial number for a reference item data entry) based on a product title crawled from an information host.

In some embodiments, as a result of data crawling or other operation (e.g., transmitting a data request, receiving passively, etc.), device 200 may receive image data associated with a reference item from a remote device (e.g., an information host). Image data may include an image, a combination of pixels, an image file (e.g., a Joint Photographics Expert Group (JPEG) file), a portion of an image, image metadata, and/or the like. In some embodiments, received image data (e.g., reference image data) may comprise multiple images, which may have been crawled from a single item page (e.g., webpage) of a reference item (e.g., images of an item at different angles, with other objects near the item, etc.) and/or multiple item pages (e.g., webpages for the reference item hosted by the same information host).

In some embodiments, device 200 may generate a condensed version of image data. For example, device 200 may vectorize an raster image (e.g., by tracing the image and re-generating it as a vector image), which may allow for manipulation such as re-sizing an image. Device 200 may also apply an image or file compression technique to compress image data. As another example, device 200 may generate a condensed data representation of image data focusing on a combination of portions from an image. Such a data representation may identify unique portions of an image while reducing the quantity of data representing less unique portions of an image (e.g., repetitive white or black pixels, an area of uniform color, an area outside of a predicted object, etc.). In some embodiments, device 200 may perform a boundary detection process, which may determine an outline of a shape (e.g., a shape of a product), which may be based on pixel gradients, color gradients, or other gradients within the image data. In some embodiments, a crawler may identify a primary product image from a webpage, and may extract the primary product image while ignoring other images on the webpage or accessible from the webpage.

In some embodiments, a device 200 or multiple devices 200 may operate multiple crawlers. For example, reference text data may be crawled from a webpage and/or tagged by a first web crawler (e.g., operated by a device 200), and reference image data may be crawled by a second web crawler (e.g., operated by the same device 200 operating a first web crawler, or a different device 200). As another example, a crawler may be configured to crawl data from a particular information host. For example, a particular information host may be determined to include certain item data (e.g., a model number of an item) following a particular HTML element, and a crawler may be correspondingly configured to search for that item data near the HTML element. In some embodiments, one crawler, which may be termed a broad data crawler, may be configured to crawl an entire website and/or large group of webpages, which may, in some instances, involve many days of heavy computational processing. However, in these embodiments, another crawler, which may be termed a narrow data crawler, may be configured to crawl only a narrow set of webpages and/or only particular webpage information, allowing it to more quickly detect relevant information (e.g., re-assessing webpage information every few seconds, few minutes, etc.). In some embodiments, both a broad data crawler and a narrow data crawler may be implemented together, to continually monitor important information while still ensuring that no possibly relevant item information is neglected due to the narrowness of a narrow data crawler.

At step 304, device 200 may determine candidates, which may include candidate items or candidate item data. Candidate item data may be associated with one or more candidate items (e.g., items to analyze with respect to reference item data, items associated with information stored in a system, items having verified data, items for which data was not received from an information host within a recent timeframe). In some embodiments, device 200 may determine candidate text data and/or candidate image data associated with at least one candidate item. In some embodiments, candidate text data and/or candidate image data may include information similar to information for text data and/or image data, discussed above. In some embodiments, device 200 may determine candidate image data according to process 400, discussed below.

In some embodiments, determining candidates may comprise selecting a subset of data, such as candidate item text and/or candidate item images (e.g., stored in a database). For example, device 200 may select a subset of the candidate item images as candidate image data based on a comparison, such as a comparison between embeddings (discussed with respect to FIG. 4), which may reduce the amount of data used for some steps (e.g., steps 306-320). Device 200 may also select a subset of the candidate item text as candidate text data based on the comparison.

In some embodiments, device 200 may compare reference item data to candidate text and/or image data (e.g., according to process 400). In some embodiments, such as embodiments where reference text data is tokenized (e.g., according to step 308) prior to determining candidates, device 200 may compare tokenized text data to other item data, such as candidate text data, which may be stored in a database. For example, device 200 may perform an elastic search across stored item data using reference text data or tokenized reference text data.

In some embodiments, device 200 may tag a portion of reference text data as a price of the reference item. Tagging a portion of reference text data may include entering a portion of reference text data associated with a price (e.g., detected according to a model) into a structured field generated for the reference text data (e.g., a price field). Additionally or alternatively, device 200 may tag a portion of reference text data as a title, product name, model number, etc. Device 200 may also select a subset of the item data at least in part by selecting item data including reference item text indicating a price within a predetermined range of a tagged price. By selecting a subset of the item data (e.g., as candidate item data), device 200 may improve the speed and efficiency of other operations (e.g., applying models to data).

In some embodiments, candidate text data may include a set of canonical attributes of a candidate item. Canonical attributes may be pieces of data that are associated with a high likelihood of information being associated with a particular item (e.g., a candidate item) and/or unique item aspects linked to an item by a user. For example, a canonical attribute may be an attribute associated with the product that is not expected to change. To further this example, some items may have a different cosmetic or other feature, such as a color, pattern, or design, but which may be treated as semantically the same (e.g., due to association rules influence by a user). Different items may have different sets of canonical attributes, and a canonical attribute may include a color, a dimension, a model number, a weight, a shape, a pattern, a design, a scent, a material, a time of production, a multi-part item, an item feature, a product name, a manufacturer, a text string within a product description; an image feature, and/or an image. For example, a canonical attribute may be an item specification (described above). By way of example and not limitation, a particular cellphone (e.g., an item) may be known to have a particular type of camera (e.g., having a specific number of megapixels), which may be considered a canonical attribute (e.g., an attribute associated with the product that is not expected to change).

At step 306, device 200 may receive item data (e.g., from a database, such as database 160), which may be associated with candidate data and/or items determined at step 304. For example, device 200 may receive the subset of candidate item images, discussed with respect to step 304. Item data received by device 200 may include reference item data, which may be associated with one or more reference items (e.g., an item to analyze with respect to older item data received from an information host). In some embodiments, item data may comprise reference image data, which may comprise images of items (e.g., images stored in a database). In some embodiments, item data may comprise reference text data, which may comprise symbols, characters, words, phrases, and/or other textual data associated with an item (e.g., a candidate item). In some embodiments, item data may comprise at least one pair of a reference item image and reference item text, where the reference item image and reference item text for the pair may relate to a same item (e.g., product).

At step 308, device 200 may tokenize candidate text, which may be based on candidate item data determined at step 306. Candidate text may include text data (described above) associated with a candidate item. Tokenizing text may comprise parsing text, classifying text, separating text, generating a syntax tree based on candidate and/or reference text, generating a unique identifier for a text string (e.g., by applying a hash algorithm to a text string), generating a token type-value pair, and/or any operation to convert text information associated with an item into data elements comparable by a model. In some embodiments, tokenizing text may generate a plurality of text tokens, which may be associated with candidate text and/or reference text. Alternatively or additionally, device 200 may tokenize reference text, which may be text data received from an information host, which may be associated with an item (e.g., a seller of the item).

At step 310, device 200 may select a text correlation model. For example, device 200 may select a text correlation model from among multiple stored text correlation models (e.g., stored at text modeling device 122, database 124, etc.). In some embodiments, a text correlation model may be selected based on a website or an entity associated with a remote device (e.g., a remote device from which data is received and/or crawled at step 302). Alternatively or additionally, a text correlation model may be selected based on a category of a reference item (e.g., automobile, cellphone, home good, etc.). For example, a text correlation model may be selected that comprises parameters particularized for unique aspects (e.g., data structures, formats, etc.) of a particular website, seller, category, item, etc. By way of example, a text correlation model may be trained using training data partially or entirely sourced from a particular entity (e.g., entity associated with an information host). Such training may result in a trained model with particularized parameters for a particular entity (or seller, product category, etc., as the case may be). As another example, a particular website, seller, information host, etc. may commonly include a string of irrelevant text, which a model may be trained to ignore, improving speed and accuracy of text correlation determinations.

At step 312, device 200 may apply a text correlation model, which may have been selected at step 310. In some embodiments, device 200 may determine a first similarity score by applying the text correlation model to text data (e.g., received reference text data) and candidate text data. For example, the text correlation model may accept reference text data as an input and apply comparisons, manipulations, or other operations to the reference text data based on candidate text data, to product a text correlation model output. In some embodiments, the text correlation model may be a random forest model. In some embodiments, a text correlation model may contain a text frequency parameter (e.g., a "hit-count" parameter), which may have a weight that is inversely related to a frequency of a character combination (a product name, phrase, etc.) in a reference dataset (e.g., in reference text data, a stored group of datasets, a subset of stored datasets, such as candidate text data, etc.). In this manner, a text correlation model may be able to determine a unique source of reference data (e.g., a unique seller associated with item text on a webpage) and/or make more accurate match determinations. In some embodiments, a first similarity score may be based on multiple other similarity scores. For example, device 200 may determine similarity scores for multiple comparisons between a reference text dataset and multiple candidate text datasets, and the first similarity score may be a mean, median, weighted combination, or other combination of the multiple similarity scores.

In some embodiments, the first similarity score may relate to a set of canonical attributes (discussed above). For example, determining a first similarity score may comprise determining a set of reference attributes of the reference item corresponding to the set of canonical attributes; and comparing the reference set of attributes to the set of canonical attributes. For example, a first similarity score may represent multiple degrees of similarity between reference attributes and canonical attributes (e.g., a degree of similarity for each reference attribute and corresponding canonical attribute). By way of further example, a first similarity score may be a mean, median, range, variance, covariance, vector, or other quantification (statistical or otherwise) of a comparison between reference attributes and canonical attributes. For example, a similarity score may be a variance of values representing the reference attributes and the canonical attributes. As another example, reference attributes and canonical attributes may be represented within respective vectors, and a similarity score may be a vector distance between the vectors.

In some embodiments, a text correlation model may be trained to ignore a property of text data (e.g., received reference text data) when determining a first similarity score. For example, a text correlation model may be trained to ignore an item specification (e.g., a color of a reference item, a second item included with a first item, etc.). An ignored property may be based on a user input (e.g., input at management device 170). In this manner, a text correlation may determine a higher similarity score than a similarity score determined without ignoring any item specification. Such configurations may be useful to a user who is interested in item matches that are less than exact (e.g., matches for technically different items that may be treated similarly for purposes of a pricing plan).

At step 314, device 200 may manipulate input image data, which may be a portion of data crawled at step 302 (e.g., reference image data). For example, device 200 may perform a cropping operation, a re-sizing operation, a brightness alteration operation, a contrast alteration operation, a deletion operation, and/or an interpolation operation on the reference image data. In some embodiments, device 200 may perform any or all of these operations as part of applying an image correlation model to reference image data (described with respect to step 318).

At step 316, device 200 may select an image correlation model. An image correlation model may be a computerized model configured to correlate, match, and/or otherwise associate image data (e.g., image data received from an information host and image data associated with a reference item). For example, an image correlation model may be a random forest model. Just as device 200 may select a text correlation model based on a website or an entity associated with a remote device, device 200 may also select an image correlation model in the same manner, described above with respect to step 310 (e.g., select a text correlation model for a particular website, entity, seller, category, etc.).

At step 318, device 200 may apply an image correlation model, which may have been selected at step 316. Applying the image correlation model to the reference image data may comprise comparing reference image data to candidate image data. In some embodiments, device 200 may determine a second similarity score by applying the image correlation model to reference image data and candidate image data. Determining a second similarity score may include aspects described above with respect to the first similarity score (e.g., determining a median, mean, variance, etc.). By way of example, an image correlation model may perform a pixel-by-pixel comparison between the images, and may produce difference values (including the possibility of zero difference for two pixels) for the pixel comparisons. The image correlation model may then calculate a mean and variance of the difference values. In some embodiments, an image correlation model may segment a reference image and a candidate image (e.g., into a 200×200 grid of sub-images) and compare the segments. In some embodiments, an image correlation model may generate a unique identifier for an image or a portion of an image (e.g., applying a hash algorithm to pixel values), and may compare unique identifiers between a reference image (or portion of a reference image) and a candidate image (or portion of a candidate image), to determine a second similarity score. In some embodiments, an image correlation model may be image resolution-agnostic. For example, an image correlation model may be configured to ignore a resolution of a reference image and/or a candidate image. This may allow an image correlation model to generate more accurate confidence scores and/or reduce false negatives of matches.

Similar to the text correlation model, in some embodiments, an image correlation model may be trained to ignore a property of image data (e.g., received reference image data) when determining a second similarity score. For example, an image correlation model may be trained to ignore a color (e.g., a color of a reference item, which may be a color within a shape determined through edge detection). In some embodiments, an ignored property may be based on a user input (e.g., input at management device 170). Similar to using ignored properties in the context of text correlation models (mentioned above), in this manner, an image correlation may determine a higher similarity score than a similarity score determined without ignoring any properties. Such configurations may be useful to a user who is interested in item matches that are less than exact matches (e.g., less than equivalent data matches, but still corresponding to a semantic match).

In some embodiments, the second similarity score may be based on third similarity scores. For example, in some embodiments, comparing the reference image data to the candidate image data may include performing a plurality of image comparisons (e.g., comparing a single reference image to multiple candidate images, comparing multiple reference images to a single candidate image, or comparing multiple reference images to multiple candidate images). In these embodiments or others, applying the image correlation model to the reference image data may comprise calculating a third similarity score for each of the image comparisons. As stated above, the second similarity score (e.g., a similarity score associated with applying an image correlation model) may be based on third similarity scores. For example, the second similarity score may be a maximum of the third similarity scores. As another example, the second similarity score may be the average, median, or some other statistical or other combination of the third similarity scores.

At step 320, device 200 may calculate a confidence score, which may be based on an application of a model (e.g., a scoring model). In some embodiments, device 200 may calculate a confidence score based on the first and second similarity scores (determined by the text correlation and image correlation models, respectively). Device 200 may calculate a confidence score while weighting the first and second similarity scores equally or unequally. In some embodiments, the confidence score may be a single value, multiple values, an expression, a Euclidean distance, or any quantifier of confidence in a model result. In some embodiments, the confidence score may be a mean or other statistical combination of the first and second similarity scores. Alternatively or additionally, the confidence score may be based on historically calculated values and/or match results (e.g., confidence scores calculated previously for processes involving similar reference or candidate data, user confirmations of previous matches or non-matches, etc.). For example, a previous match between a reference item and a candidate item may strengthen an association between image data, text data, and the like, such that clusters of associated data may be formed. In some embodiments, if a reference item has a high degree of similarity with a threshold amount of data in a cluster, the confidence score may be higher, reflecting the stronger associations represented by the cluster. In some embodiments, the confidence score may be based on only the first similarity score or the second similarity score.

At step 322, device 200 may determine whether a confidence score (e.g., calculated at step 320, received from another device, etc.) falls below a threshold. In some embodiments, device 200 may determine whether the confidence score is equal to or greater than a threshold. A threshold may be a single value, multiple values, an expression, a Euclidean distance, or any quantifier comparable to a confidence score. For example, a threshold may comprise a threshold image similarity confidence value and a threshold image metadata similarity confidence value, and device 200 may determine whether the confidence score, is equal to or greater than the threshold image similarity confidence value and the threshold image metadata similarity confidence value. A threshold may also be determined by a user input, a machine input (e.g., an output from a computerized model configured to suggest a threshold based on previous thresholds used and previous matches and/or non-matches determined), or a combination of both.

In some embodiments, device 200 may perform a responsive action based on the calculated confidence score. The responsive action may include one or more of creating an association, changing a text correlation model, and/or changing an image correlation model. These examples and others are described further with respect to step 324, 326, and 328.

At step 324, device 200 may confirm a match, which may be a match between reference item data and candidate item data. In some embodiments, device 200 may confirm a match based on a model output (e.g., a model output from step 312 and/or 318) and/or a user input (e.g., a user input verifying whether a model output is acceptable). In some embodiments, device 200 may only confirm a match when the confidence score satisfies a threshold. A confidence score may satisfy a threshold in a number of ways. For example, a confidence score may be a value and may satisfy a threshold by being equal to or greater than a threshold value. In other embodiments, a confidence score may be a value and may satisfy a threshold by being less than a threshold value. In some embodiments, a confidence score may include multiple values, a numerical expression, or other form of quantification. In some embodiments, device 200 may confirm a match when a confidence score does not satisfy a threshold if device 200 receives a user input indicates that a match exists.

In some embodiments, device 200 may perform a responsive action based on the confirmed match. For example, in some embodiments, such as when the confidence score satisfies the threshold, device 200 may create an association between a reference item and a candidate item (e.g., after determining a match). In some embodiments, device 200 may create an association between particular data attributes of a reference item and a candidate item. For example, device 200 may create an association between a seller identifier of the reference item and a seller identifier of the candidate item (e.g., where both items are determined to be associated with a same seller). Alternatively or additionally (e.g., when the confidence score satisfies the threshold), device 200 may monitor a webpage associated with a reference item to detect a change in information associated with the reference item at the webpage. A change may be associated with a price of a reference item at the monitored webpage, a model number of a reference item at the monitored webpage, a discount of a reference item at the monitored webpage, etc. In some embodiments, device 200 (e.g., discovery device 102) may transmit a notification to a user device (e.g., management device 170) upon detecting the change in information. For example, this may allow a user to effectively monitor verified matched items without receiving information updates for irrelevant items.

At step 326, device 200 may reject a match, which may indicate a lack of a correlation between reference item data and candidate item data. In some embodiments, such as when the confidence score falls below the threshold, device 200 may determine a differentiation factor, which may indicate a difference between a reference item and at least one candidate item. In some embodiments, the differentiation factor may be associated with a difference between a first item specification (e.g., a first color, a first shape, a first size, a first model number, etc.) of a reference item and a second item specification (e.g., a second color, a second shape, a second size, a second model number, etc.) of the candidate item. In some embodiments, device 200 may reject a match based on a model output (e.g., a model output from step 312 and/or 318) and/or a user input (e.g., a user input verifying whether a model output is acceptable).

In some embodiments, device 200 may generate a user interface (e.g., at display 214) that includes one or more rejected matches. Such a user interface may include rejected matches relating to one or more reference item datasets and/or reasons for at least one match being rejecting (e.g., lack of correlation between color data between two images, lack of correlation between combinations of text in reference text data and candidate text data, etc.). The user interface may include a button, table, graph, drop-down menu, slider bar, filter, search bar, text box, and/or other interactable graphical element, which may allow a user to interact with information relating to rejected matches. For example, a user may confirm a rejection of a match, or may reject a rejection (e.g., model-generated rejection) of a match. Such user input may help to further improve model output results, which may be input back into a model (e.g., at step 328) to improve future results, enhance model training, etc. As another example, a user may select a graphical element (e.g., a filter) which may order (e.g. sort) multiple data entries associated with rejected matches according to a confidence score. In some embodiments, a graphical element may not be interactable (e.g., may display static or dynamic information, such as a calculated confidence score, which may not be directly modifiable by a user). Continuing this example, only data entries associated with lower confidence scores (e.g., lower than a threshold score according to a selected filter) may be displayed and/or data entries associated with lower confidence scores may be displayed at a higher portion of a display. While such user interfaces have been described in the context of rejected matches, it is contemplated that these user interfaces may be generated to likewise include confirmed matches and similarly related information.

At step 328, device 200 may modify a model (e.g., a responsive action), such as a model associated with correlating text data (e.g., a model implemented by text modeling device 122) and/or a model associated with correlating image data (e.g., a model implemented by image modeling device 132). For example, device 200 may adjust a parameter of a text model or an image model using a differentiation factor or may add a new parameter to the text model or image model based on a differentiation factor. For example, device 200 may increase a model weight associated with the differentiation factor, which may help reduce false negatives in future uses of the model. As another example, device 200 may generate a new vector (e.g., a linear layer vector, which may be integrated into a model to reconfigure relationships between model layers), which may be used by a model to more accurately make predictions using the differentiation factor. For example, device 200 may have determined new associations between elements of different layers within a model, and the new vector may link those elements according to the determined associations. As yet another example, device 200 may strengthen an association between parameters of a model (e.g., unidirectional or bidirectional influencing variables). Additionally or alternatively, device 200 may remove a parameter of a model based on a differentiation factor.

In some embodiments, after modifying a model, device 200 may re-apply the model to data. For example, after modifying a text correlation model, device 200 may re-apply the text correlation model to reference text data. In some embodiments, device 200 may continue to modify and re-apply a model until a termination condition is reached. A termination condition may include an elapsed period of time, a confidence score reaching a threshold, a training criterion being satisfied, or other criterion for terminating operation of a model to surface a result to a device (e.g., management device 170).

In some embodiments, a responsive action may comprise updating at least one of a plurality of Euclidean-space reference embedding clusters (described with respect to process 400). For example, device 200 may add or remove an embedding from a cluster (e.g., add a generated image embedding to a cluster of reference embeddings) and/or may adjust a boundary (e.g., a Euclidean-space boundary) of a cluster to reduce or increase a number of embeddings in the cluster. In some embodiments, updating a reference embedding cluster may comprise changing a reference embedding within the cluster. For example, applying an updated model (e.g., which may represent updates to associations and/or degrees of similarity) to reference item data and/or reference embeddings may cause values of reference embeddings to change (e.g., when new indicators of similarity are established, reference embeddings may be updated, which may cause distances between reference embeddings to shrink or expand).

Figure 4:
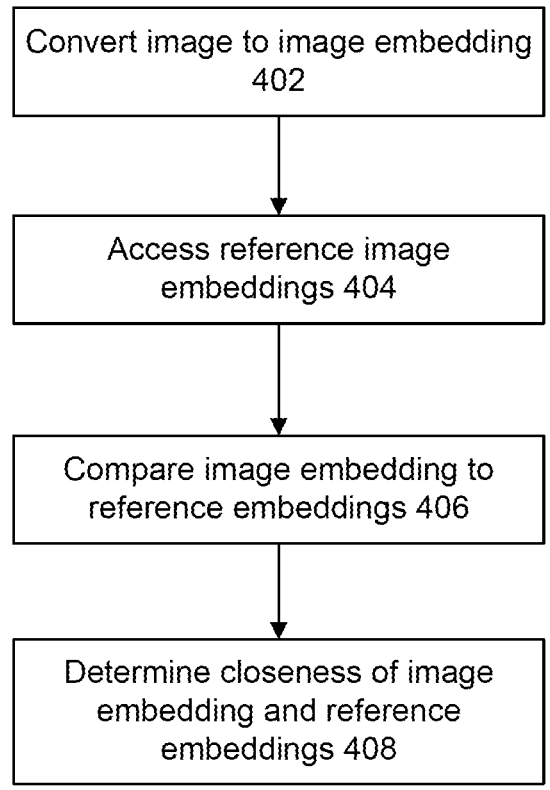
FIG. 4 depicts a flowchart of an exemplary process for image matching, consistent with disclosed embodiments.

FIG. 4 depicts a flowchart of an exemplary process 300 for image matching, which may be performed by a processor in accordance with disclosed embodiments. For example, process 400 may be performed entirely or in part by device 200 (e.g., using processor 202), such as a filter device 112 (or any other device within network architecture 10. Alternatively or additionally, some steps of process 400 may be performed by multiple devices 200, such as discovery device 102, filter device 112, text modeling device 122, and/or image modeling device 132. While process 400 is described with respect to device 200, one of skill will understand that the steps illustrated in FIG. 4 are exemplary and steps may be added, merged, divided, duplicated, repeated, modified, performed sequentially, performed in parallel, and/or deleted in some embodiments. In some embodiments, process 400 may be performed to determine a subset of reference embeddings (e.g., within a Euclidean distance of an image embedding) from among a set of reference embeddings, which may reduce processing load on a device determining candidate data (e.g., at step 304) or performing other operations associated with process 300. In some embodiments, a reference embedding may be associated with a candidate item image and candidate item text. For example, a reference embedding may represent image data (e.g., an image) and text data (e.g., an item title, item specification, metadata, item description, the like, or any combination thereof) of a single item (e.g., product), which may be or have been described at a webpage. In some embodiments, separate reference embeddings may exist for the same product described at different webpages, with the separate reference embeddings corresponding to the different webpages.

At step 402, device 200 may convert at least one image, which may have been received from an information host and/or constitute reference image data, to an image embedding. An image embedding may comprise a vector containing floating-point values associated with pixel information of an image (e.g., red-green-blue (RGB) values of an individual pixel for a color image, a brightness value of an individual pixel for a grayscale image, etc.). Additionally or alternatively, an image embedding may comprise a string (e.g., a unique string of characters associated with the image). In some embodiments, an image embedding may be generated from a condensed version of an image. For example, an image may be condensed to a predetermined pixel number approximation (e.g., 100×100 pixels) of a full (e.g., un-manipulated, uncondensed, etc.) image. Additionally or alternatively, an image embedding may contain values associated with metadata of the image. Metadata may comprise an image source indicator, a time stamp, a geographic location indicator, a retrieval time, a generation time, or any other data related to the image embedding or an image from which it was generated.

In some embodiments, an image conversion model (e.g., implemented by device 200) may convert an image to an image embedding. For example, device 200 may convert an image to an image embedding using a computer-modeled embedding layer. For example, a computer-modeled embedding layer may accept an image as input and produce a text string, values (e.g., decimal values), red-green-blue (RGB)

values, etc. as an output. As another example, a computer-modeled embedding layer may accept image values (e.g., pixel RGB values) as inputs, and may produce an image embedding as an output. An image embedding may comprise a Euclidean-space or Cartesian-space representation of an image, such as a point or a vector, which may allow for mapping semantic similarities of images (e.g., a degree of similarity between two images as observed by a human) to Euclidean or Cartesian similarities (e.g., a relative closeness in distance between elements on a Euclidean or Cartesian plane).

Converting an image to an image embedding may comprise generating an image embedding based on the image or a portion of the image. For example, device 200 may determine a portion or portions of the image from which to generate an image embedding. For example, a predetermined number and locations of pixels within an image may be used to generate an image embedding (e.g., based on pixel values). Alternatively or additionally, device 200 may determine at least one portion of the image that may be unique or distinguishing with respect to images (e.g., based on a cluster of steep color gradients), which may be used to generate an image embedding (e.g., based on pixel values associated with the gradient areas). For example, device 200 may analyze at least one image to determine a distinct portion of the at least one image, and may convert (e.g., using a computer-modeled embedding layer) the distinct portion to an image embedding.

In some embodiments, converting the at least one image to the image embedding may comprise removing background pixels from the at least one image (e.g., prior to generating an image embedding). For example, such as by using edge detection techniques and/or identifying image portions with large color uniformity, device 200 may determine certain pixels (e.g., background pixels) to remove from the image, which may help to reduce the size of an image file, which may reduce strain on storage and/or processing resources (e.g., resources for performing steps of process 300 and/or process 400). Additionally or alternatively, converting an image to an image embedding may comprise performing at least one of a cropping operation (e.g., removing a portion of an image), a re-sizing operation (e.g., altering a size of an image, such as a vectorized image), a brightness alteration operation, a contrast alteration operation, a rotation operation (e.g., rotating an image and/or a portion of an image, such as an object), a deletion operation (e.g., deleting a portion of an image), and/or an interpolation operation on the at least one image (e.g., prior to generating an image embedding).

At step 404, device 200 may access reference embeddings, which may have been generated prior to an image embedding generated at step 402. For example, reference embeddings may have been generated from image data from information hosts that differ from an information host associated with an image converted at step 402. In some embodiments, device 200 or another device may have previously generated reference embeddings. In some embodiments, a reference embedding may have been generated from an image associated with an item that is associated with an image for which an image embedding is generated (e.g., at step 402). In some embodiments, device 200 may only access particular reference embeddings (e.g., a subset of stored reference embeddings). For example, device 200 may determine that reference embeddings are associated with an item category of the reference item, and may only access those reference embeddings. In some embodiments, a reference embedding may be generated by a device 200, and may also be modified and/or modifiable by a user (e.g., a user of management device 170). For example, a user may determine that a cropping operation should not have been performed, and may alter a reference embedding and/or cause an image reference to be re-generated without having the cropping operation performed. In some embodiments, accessing a reference embedding may comprise retrieving a reference embedding from among multiple reference embeddings stored in a database. In some embodiments, multiple reference embeddings may comprise data (e.g., values, coordinates, a vector) describing a location on a Euclidean-space plane.

At step 406, device 200 may compare an image embedding (e.g., generated at step 402) to a reference embedding. In some embodiments, comparing an image embedding to reference embeddings comprises performing a Euclidean-space nearest-neighbor search. For example, device 200 may compare Euclidean-space values of an image embedding to Euclidean-space values of at least one reference embedding, to determine a reference embedding or multiple reference embeddings having a relative minimum distance to the image embedding on a Euclidean space. For example, device 200 may compare Euclidean-space values by calculating a distance between points on a Euclidean plane. In some embodiments, reference embeddings compared to an image embedding may be part of a Euclidean-space embedding cluster among a plurality of Euclidean-space reference embedding clusters. For example, a device (e.g., database 160) may store a number of reference embeddings described with respect to a Euclidean space, and the reference embeddings may be grouped into clusters. For example, a model may analyze reference embedding values, which may be associated with respective images, and group similar embedding values into clusters. By way of further example, a cluster may be associated with a particular product category, image type, image parameter, item identifier, or other item data. In some embodiments, clusters may be structured into tiers (e.g., groups and sub-groups). By way of example, a cluster may exist for vehicles (a broad tier or group), a cluster may exist within the vehicle cluster for pickup trucks (a narrower tier or sub-group), and a cluster may exist within the pickup truck cluster for pickup trucks associated with Ford® (e.g., an even narrower tier or sub-sub-group).

At step 408, device 200 may determine a closeness of an image embedding and a reference embedding. For example, based on a comparison between at least one value of an image embedding and at least one value of a reference embedding (e.g., at step 406), device 400 may determine a distance (e.g., closeness) between the image embedding and the reference embedding. In some embodiments, based on the determined distance, device 400 may determine that the reference embedding or information related to the reference embedding (e.g., an associated image, item information, etc.) should be part of a set of candidate data (e.g., as described with respect to process 300). In some embodiments, device 200 may perform steps of process 400 repeatedly to determine a threshold number of reference embeddings to use as candidate data. By way of example and not limitation, device 200 may determine the 200 nearest neighbor reference embeddings to an image embedding on a Euclidean plane, and may use those 200 reference embeddings to determine candidate data (e.g., for use in process 300).

The foregoing description has been presented for purposes of illustration. It is not exhaustive and is not limited to the precise forms or embodiments disclosed. Modifications and adaptations of the embodiments will be apparent from consideration of the specification and practice of the disclosed embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer programs based on the written description and methods of this specification are within the skill of a software developer. The various functions, scripts, programs, or modules can be created using a variety of programming techniques. For example, computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages (including an object oriented programming language and/or conventional procedural programming language) such as Smalltalk, C++, JAVASCRIPT, C, C++, JAVA, PHP, PYTHON, RUBY, PERL, BASH, or other programming or scripting languages. One or more of such software sections or modules can be integrated into a computer system, non-transitory computer-readable media, or existing communications software. The programs, modules, or code can also be implemented or replicated as firmware or circuit logic. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

These computer readable program instructions may be provided to a processor of a general purpose computer, special purpose computer, or other programmable data processing apparatus, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

The flowcharts and block diagrams in the Figures illustrate the architecture, functionality, and operation of possible implementations of systems, methods, and computer program products according to various embodiments of the present disclosure. In this regard, each block in the flowcharts or block diagrams may represent a software program, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Moreover, some blocks may be executed iteratively for any number of iterations, and some blocks may not be executed at all. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It is appreciated that certain features of the disclosure, which are, for clarity, described in the context of separate embodiments, may also be provided in combination in a single embodiment. Conversely, various features of the disclosure, which are, for brevity, described in the context of a single embodiment, may also be provided separately or in any suitable sub-combination or as suitable in any other described embodiment of the disclosure. Certain features described in the context of various embodiments are not to be considered essential features of those embodiments, unless the embodiment is inoperative without those elements.

Moreover, while exemplary embodiments have been described herein, these have been presented for purposes of illustration, but are not intended to be exhaustive or limited to the embodiments disclosed, such that the scope includes any and all embodiments having equivalent elements, modifications, variations, omissions, combinations (e.g., of aspects across various embodiments), adaptations or alterations, without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein. The elements in the claims are to be interpreted broadly based on the language employed in the claims and not limited to examples described in the present specification or during the prosecution of the application, which examples are to be construed as non-exclusive. Further, the steps of the disclosed methods can be modified in any manner, including by reordering steps or inserting or deleting steps. It is intended, therefore, that the specification and examples be considered as examples only, with a true scope and spirit being indicated by the following claims and their full scope of equivalents.

What is claimed is:

1. A system for correlating item data, the system comprising:
   at least one processor; and
   a non-transitory computer-readable medium containing a set of instructions that, when executed by the at least one processor, cause the processor to perform steps comprising:
   receiving text data associated with a reference item from a remote device;
   receiving image data comprising at least one image associated with the reference item from the remote device;
   converting, using a computer-modeled embedding layer, the at least one image to an image embedding;
   comparing the image embedding to reference embeddings stored in a database by determining a subset of the reference embeddings within a Euclidean distance of the image embedding, the stored reference embeddings being associated with pairs of candidate item images and candidate item text of candidate items;
   selecting, based on the comparison, candidate text data, wherein the candidate text data:
   is a subset of the candidate item text, and
   includes a price within a predetermined range;
   selecting, based on the comparison, candidate image data, the candidate image data being a subset of the candidate item images;
   selecting a text correlation model;
   determining a first similarity score by applying the selected text correlation model to the received text data and the subset of the candidate item text;
   selecting an image correlation model;
   determining a second similarity score by applying the selected image correlation model to the received image data and the subset of the candidate item images;
   calculating a confidence score based on the determined first and second similarity scores; and
   performing a responsive action based on the calculated confidence score, wherein the responsive action comprises creating an association between the reference item and one of the candidate items;
   wherein at least one of the text correlation model or the image correlation model is selected based on a category of the reference item.

2. The system of claim 1, wherein converting the at least one image to the image embedding comprises removing background pixels from the at least one image.

3. The system of claim 1, wherein converting the at least one image to the image embedding comprises performing at least one of a cropping operation, a re-sizing operation, a brightness alteration operation, a contrast alteration operation, or an interpolation operation on the at least one image.

4. The system of claim 1, wherein the image embedding is a vector containing floating-point values associated with pixel information of the at least one image.

5. The system of claim 4, wherein the image embedding further contains values associated with metadata of the at least one image.

6. The system of claim 4, wherein comparing the image embedding to reference embeddings comprises performing a Euclidean-space nearest-neighbor search.

7. The system of claim 6, the steps further comprising determining that the reference embeddings are associated with an item category of the reference item.

8. The system of claim 7, wherein the compared reference embeddings are part of a Euclidean-space embedding cluster among a plurality of Euclidean-space reference embedding clusters.

9. The system of claim 8, wherein the responsive action further comprises updating at least one of the plurality of Euclidean-space reference embedding clusters by performing at least one of:
   adding a reference embedding to one of the Euclidean-space reference embedding clusters;
   removing a reference embedding from one of the Euclidean-space reference embedding clusters; or
   adjusting a boundary of one of the Euclidean-space reference embedding clusters.

10. The system of claim 1, wherein:
    the candidate text data includes a set of canonical attributes of the one of the candidate items; and
    determining the first similarity score comprises:
    determining a set of reference attributes of the reference item corresponding in part to the set of canonical attributes; and
    comparing the reference set of attributes to the set of canonical attributes.

11. The system of claim 10, wherein at least one of the canonical and reference attributes corresponds to: a color, a dimension, a model number, a weight, a shape, a scent, a material, a time of production, a multi-part item, or an item feature.

12. The system of claim 1, wherein the steps further comprise:
    determining whether the calculated confidence score falls below a threshold; and
    when the calculated confidence score falls below the threshold, determining a differentiation factor indicating a difference between the reference item and at least one of the candidate items; and
    wherein the responsive action comprises adjusting a parameter of the text model or the image model using the differentiation factor or adding a new parameter to the text model or image model based on the differentiation factor.

13. The system of claim 1, wherein the steps further comprise:
    determining whether the calculated confidence score is equal to or greater than a threshold; and
    when the calculated confidence score is equal to or greater than the threshold:
        creating an association between the reference item and the one of the candidate items;
        monitoring a webpage associated with the reference item to detect a change at the webpage; and
        transmitting a notification to a user device upon detecting a change to information associated with the reference item at the webpage.

14. The system of claim 13, wherein the detected change is associated with a price of the reference item at the monitored webpage.

15. The system of claim 1, wherein the selected image correlation model is a random forest model.

16. The system of claim 1, wherein the selected text correlation model contains a text frequency parameter having a weight that is inversely related to a frequency of a character combination in a reference dataset.

17. The system of claim 1, wherein the selected text correlation model is trained to ignore a property of the received text data when determining the first similarity score or the image correlation model is trained to ignore a property of the received image data or the reference image data when determining the second similarity score.

18. The system of claim 17, wherein the ignored property is based on a user input.

19. A computer-implemented method for correlating item data comprising:
    receiving text data associated with a reference item from a remote device;
    receiving image data comprising at least one image associated with the reference item from the remote device;
    converting, using a computer-modeled embedding layer, the at least one image to an image embedding;
    comparing the image embedding to reference embeddings stored in a database by determining a subset of the reference embeddings within a Euclidean distance of the image embedding, the stored reference embeddings being associated with pairs of candidate item images and candidate item text of candidate items;
    selecting, based on the comparison, candidate text data, wherein the candidate text data:
        is a subset of the candidate item text, and
        includes a price within a predetermined range;
    selecting, based on the comparison, candidate image data, the candidate image data being a subset of the candidate item images;
    selecting a text correlation model;
    determining a first similarity score by applying the selected text correlation model to the received text data and the subset of the candidate item text;
    selecting an image correlation model;
    determining a second similarity score by applying the selected image correlation model to the received image data and the subset of the candidate item images;
    calculating a confidence score based on the determined first and second similarity scores; and
    performing a responsive action based on the calculated confidence score, wherein the responsive action comprises creating an association between the reference item and one of the candidate items,
    wherein at least one of the text correlation model or the image correlation model is selected based on a category of the reference item.

20. A system for correlating item data, the system comprising:
    a database storing associations between item data;
    a computing device comprising:
        at least one processor; and
        a non-transitory computer-readable medium containing a set of instructions that, when executed by the at least one processor, cause the processor to perform steps comprising:
            receiving text data associated with a reference item from a remote device;
            receiving image data comprising at least one image associated with the reference item from the remote device;
            analyze the at least one image to determine a distinct portion of the at least one image;
            converting, using a computer-modeled embedding layer, the distinct portion to an image embedding;
            comparing the image embedding to reference embeddings stored in the database by determining a subset of the reference embeddings within a Euclidean distance of the image embedding, the stored reference embeddings being associated with pairs of candidate item images and candidate item text of candidate items;
            selecting, based on the comparison, candidate text data, wherein the candidate text data:
                is a subset of the candidate item text, and
                includes a price within a predetermined range;
            selecting, based on the comparison, candidate image data, the candidate image data being a subset of the candidate item images;
            selecting a text correlation model;
            determining a first similarity score by applying the selected text correlation model to the received text data and the subset of the candidate item text;
            selecting an image correlation model;
            determining a second similarity score by applying the selected image correlation model to the received image data and the subset of the candidate item images;
            calculating a confidence score based on the first and second similarity scores; and
            performing a responsive action based on the calculated confidence score, wherein the responsive action comprises creating an association between the reference item and one of the candidate items,
            wherein at least one of the text correlation model or the image correlation model is selected based on a category of the reference item.

* * * * *